Aug. 17, 1965　　　　M. A. ARGENTIERI　　　　3,200,498
DISPLAY SYSTEM
Filed July 22, 1960　　　　　　　　　　　　　2 Sheets-Sheet 1
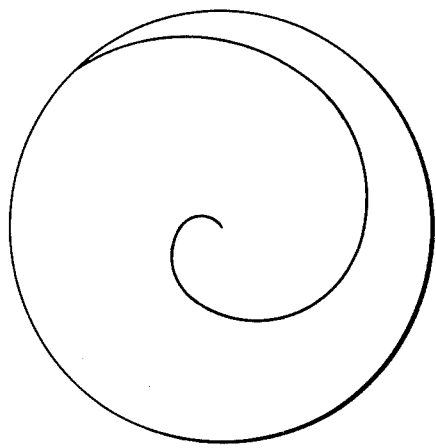
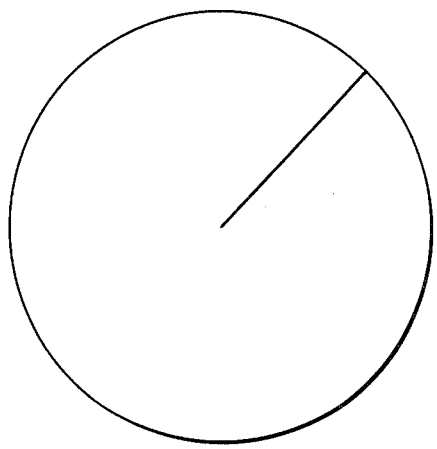
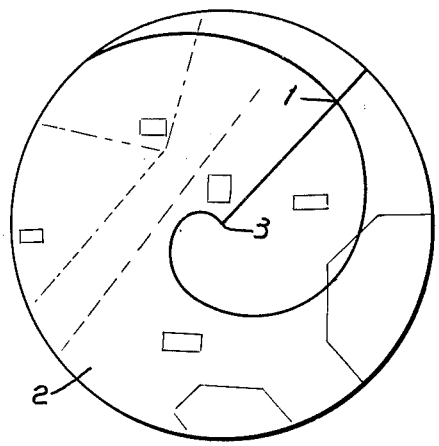
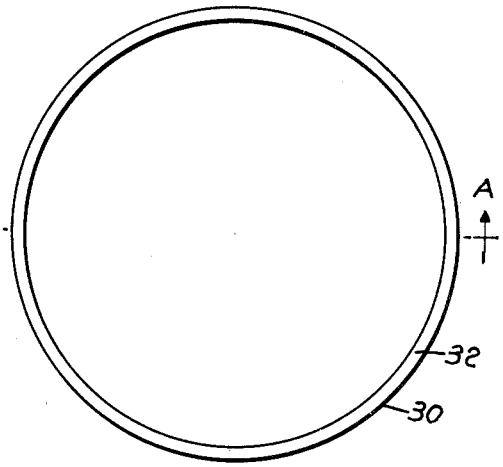
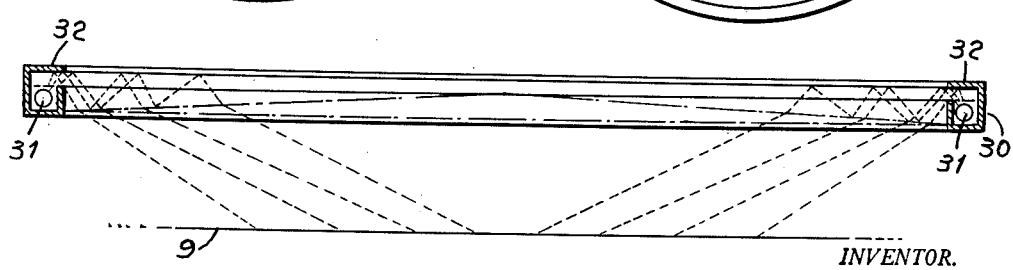
INVENTOR.
MICHAEL A. ARGENTIERI
BY Philip M. Bolton
ATTORNEY Aug. 17, 1965  M. A. ARGENTIERI  3,200,498
DISPLAY SYSTEM
Filed July 22, 1960  2 Sheets-Sheet 2
*Fig. 4*
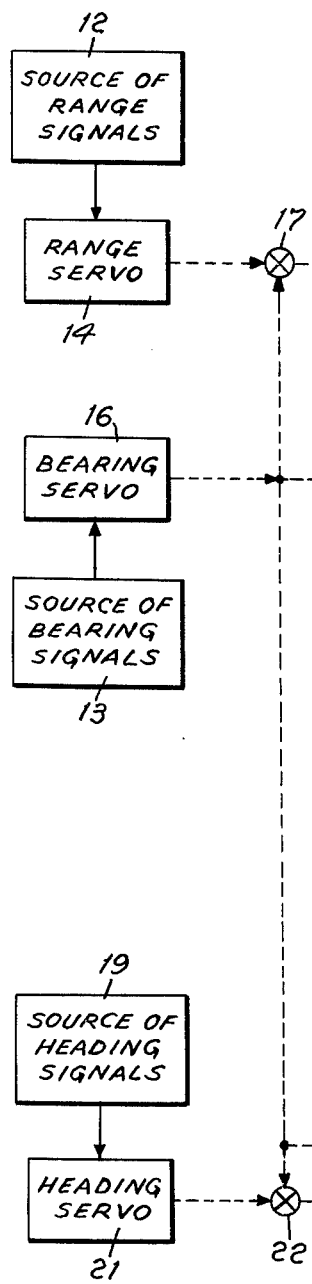
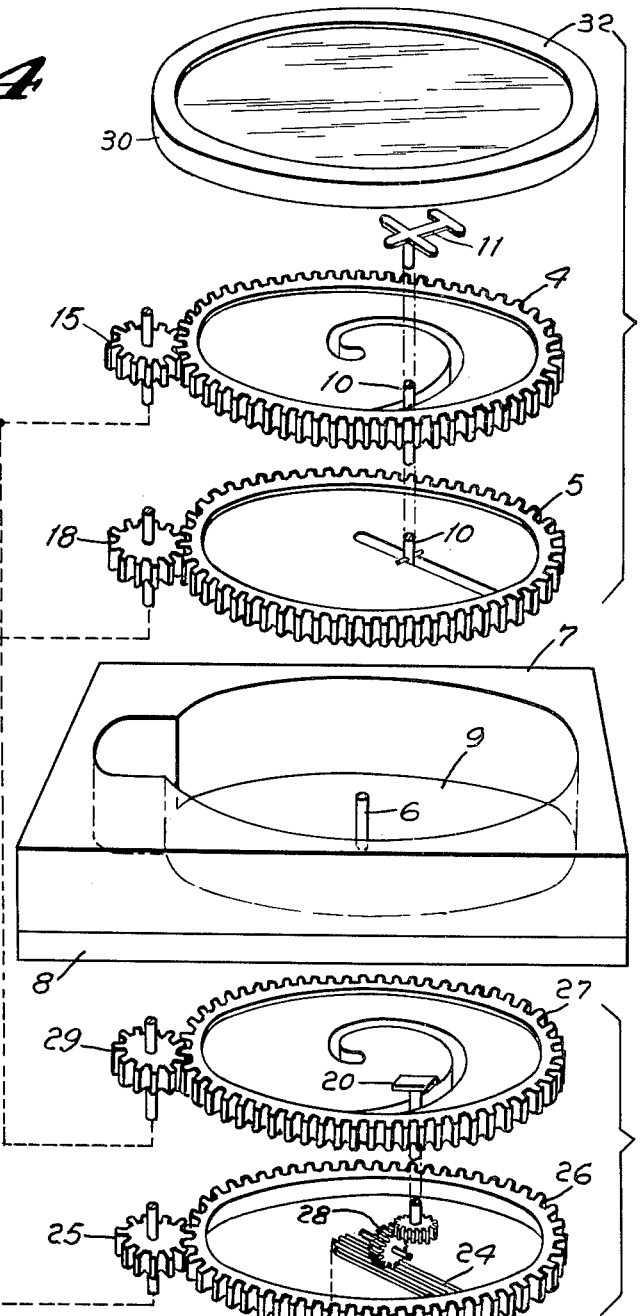
INVENTOR.
MICHAEL A. ARGENTIERI
BY Philip M. Bolton
ATTORNEY United States Patent Office 3,200,498
Patented Aug. 17, 1965

3,200,498
DISPLAY SYSTEM
Michael A. Argentieri, Lyndhurst, N.J., assignor to International Telephone and Telegraph Corporation, Nutley, N.J., a corporation of Maryland
Filed July 22, 1960, Ser. No. 44,596
3 Claims. (Cl. 33—1)

The present invention relates to display systems and more particularly to a pictorial display system for indicating the position of a vehicle with respect to a given geographical point.

In moving vehicles, such as aircraft, it is desirable to have a navigational display which provides a pictorial presentation of the position of the vehicle with respect to a given geographic location, such as a radio beacon. Most prior art pictorial displays are based on either of two basic approaches; a small vehicle symbol positioned on the surface of a map; or a light spot (representing the vehicle) on a video display. More specifically, some existing schemes include a plastic coated map over which a curved transparent stylus is positioned in accordance with the vehicle's bearing and distance with respect to a given point on the map. The stylus is heated and melts the plastic map coating thereby producing a black trace of the stylus path. Other variations include having a vehicle symbol placed on the end of the stylus so it will be positioned above the map, or the provision of an x-y recorder such that a paper map moves in a vertical plane while a recording pen moves in a horizontal plane to provide a permanent track of the vehicle position. Still other schemes employ cathode ray tube PPI displays, and optical projection devices, all of which attempt to provide a pictorial indication of the vehicle with respect to a map or a fixed point.

The above described prior art schemes all have the disadvantage of being complex, bulky, heavy, and costly. The method of indicating the vehicle position by means of a light spot has the disadvantages that daylight operation would require a light shield for proper visibility, the maps would have to be manufactured from semi-translucent material, and the display would have to be several inches in depth, and therefore a portable unit would be difficult to manage. The scheme wherein a vehicle symbol is located at the end of a stylus arm presents parallax problems as well as the motion of the stylus being distracting to the observer. The pen recorder and heat sensitive stylus schemes are likewise distracting, and also result in a permanent marking on the map, thereby periodically requiring a new map. Further, a stylus arm will physically interfere with map changing operations.

An object of the present invention is to provide an improved pictorial display system for indicating the position of a vehicle with respect to a given point.

Another object of the present invention is to provide a portable pictorial display system which is simple, lightweight, and relatively easy to read.

A further object of the present invention is to provide a pictorial display system which is operable with existing navigational equipment.

A feature of the present invention is the provision of a position display system for indicating the position of a vehicle with respect to a given point comprising a pair of movable members, one of the members having a portion thereof formed in a given configuration, the other of the members having a portion thereof formed in another given configuration, means for mounting one of the members above the other for movement with respect thereto so that the given configurations are superimposed on different portions of each other during relative movement of the members, a first source of signals representative of one coordinate of the vehicle position, a second source of signals representative of a second coordinate of the vehicle position and means coupling the first and second sources of signals to the members for movement thereof such that the superimposed portions indicate the instantaneous vehicle position with respect to the given point.

Another feature of the present invention is the provision of a display system of the type described wherein the said pair of movable members are transparent discs, one of which has a radial line inscribed thereon representing azimuth and the other of which has a spiral line inscribed thereon representing distance such that, when the discs are superimposed, the intersection of the two lines represent the vehicle position.

Still another feature of the present invention is the provision of a display system of the type described wherein said pair of movable members are transparent discs, one of which has a radial slot cut therein representing azimuth and the other of which has a spiral slot cut therein representing distance such that, when the discs are superimposed a vehicle symbol inserted in both of said slots at the intersection thereof will represent the vehicle position.

The above-mentioned and other features and objects of this invention will become more apparent by reference to the following description taken in conjunction with the accompanying drawings, in which:

FIGURE 1 is an illustration of a movable member embodying a geometrical form which may be employed in the present invention for indicating vehicle range;

FIGURE 2 is an illustration of a movable member embodying a geometrical form which may be employed on the present invention for indicating vehicle bearing;

FIGURE 3 is an illustration of movable members of FIGURES 1 and 2 mounted one above the other to indicate vehicle range and bearing;

FIGURE 4 is an illustration in the form of an exploded view of an embodiment of a position display system following the principles of the present invention;

FIGURE 5 is an illustration of an illumination device useful in the present invention, and FIGURE 5A is a cross-sectional view thereof.

Referring to FIGURE 1, a circular disc is shown constructed from a suitable transparent material such as acrylic. A spiral line is inscribed on the surface of the disc such that the distance of points along the line from the center of the disc is a linear function of the angular position of the points. The distance of the center of the disc to the spiral line along a given direction is therefore a function of the rotation of the disc. FIGURE 2 shows a similar transparent disc having a radius equal to that of FIGURE 1, with the exception that a radial line is inscribed on the surface thereof such that the direction of the radial line is a function of the rotational position of the disc.

FIGURE 3 shows the discs of FIGURE 1 and FIGURE 2 concentrically mounted such that the spiral and radial lines are superimposed and intersect each other at a single point 1. The position of intersectional point 1 will depend on the relative position of the two discs, and will vary during relative movement of the two discs. The two discs are placed above a suitably scaled map 2 such that the center of rotation of the two discs 3 coincides with a point of known reference of the map, for example a tacan beacon. The vehicle with which the present invention is to be employed must be able to provide the bearing and distance information of its present position with respect to the point of known reference, for example an aircraft having airborne tacan or vortac equipment. The disc having the inscribed radial line is rotationally positioned in accordance with the bearing of the vehicle with respect to the reference point 3, and the disc having the spiral line is rotationally positioned in accordance with the distance of the vehicle from reference point 3 at the known bearing. The intersectional point 1 will then provide a visual indication of the position of the vehicle with respect to reference point 3. The disc having the radial line thereon (hereinafter called the bearing disc) is rotationally driven in accordance with the bearing information, and the disc having the spiral line thereon (hereinafter called the range disc) is rotationally driven in accordance with both the distance information and the bearing information. For example, if an aircraft represented by point 1 were to fly toward the tacan beacon represented by point 3 at a constant bearing, the bearing disc would remain stationary and the range disc would be driven by the range information signals in a counterclockwise direction with the result that intersectional point 1 would move in along the radial line toward point 3 at a rate equal to the aircraft and ground speed toward the station, giving a true picture of the aircraft maneuver as well as an indication of instantaneous geographical position. On the other hand, if the aircraft were to fly around the beacon at a constant range, the bearing disc and the range disc would both be rotated by the bearing information signal and will move in unison so that intersectional point 1 will describe a circular path about point 3 in agreement with the aircraft maneuver. As the aircraft moves in both bearing and range both discs will be driven accordingly and intersectional point 1 will continually represent the position of the aircraft.

FIGURE 4 is an exploded view of a display system following the principles of the present invention, but with a different type bearing and range disc structure than that shown in FIGURE 3. Transparent range disc 4 and bearing disc 5, instead of having inscribed lines, have spiral and radial slots respectively as shown. Discs 4 and 5 rotate on shaft 6 of case 7 in response to range and bearing input signals. Case 7 is designed to include a map storage compartment 8 for storing navigational maps to be later discussed. The map which is currently in use with the display system is located on top of the others and appears on surface 9 so as to be visible from above. A peg 10 is located in the spiral slot of disc 4 and the radial slot of disc 5 and is free to move in either slot. It is apparent that peg 10 will be positioned at the intersectional point of the spiral and radial slots. If disc 5 is revolved and disc 4 is stationary, peg 10 will attempt to move in a circular manner, but being also constrained by the spiral slot of disc 4, will move to or from shaft 6. Likewise, if disc 4 is revolved and disc 5 is stationary, the motion of peg 10 will be subject to the restraint due to the radial slot of disc 5. Peg 10, therefore, will be continually located at the point of intersection of the spiral and radial slots, and can therefore represent the vehicle position just as intersectional point 1 of FIG. 3. A vehicle symbol 11 is located on top of peg 10. A source of range signals 12 and a source of bearing signals 13 supply the positional information of the vehicle with respect to a point of known reference. Sources 12 and 13 may be the airborne tacan or vortac equipment presently available for aircraft and the point of known reference may be a tacan or vortac beacon. Source of range signals 12 rotatably position range disc 4 by means of range servo 14 and gear 15. Source of bearing signals 13 position range disc 4 and bearing disc 5 by means of bearing servo 16, differential 17, gear 15, and gear 18. The operation of discs 4 and 5 in response to the range and bearing signals is the same as described for the range and bearing discs of FIG. 3 with the exception that a vehicle symbol 11 is positioned with respect to shaft 6 rather than an intersectional point.

The navigational map inserted so as to appear on surface 9 is such that the point of known reference for the area, i.e. the tacan beacon, must coincide with the location of shaft 6, and is therefore at the center of the map. Maps which are currently available from the U.S. Coast and Geodetic Survey may be used, but must be modified such that the beacon is located at the center of the map and the dimensions and scale factor of the map itself will be compatible with the display device. A scale change is possible by providing range servo 14 with a suitable switch (not shown) which will change the electrical constants thereof, thereby changing the scale factor of the output signal and also providing an appropriate map having a scale factor compatible with the change in scale of the signal from range servo 14. Compartment 8 is capable of storing a plurality of such maps, each one of which relates to the geographic area surrounding a different known beacon. When the vehicle is within range of a particular beacon the related map is inserted on top of the others in the proper position, that is, with the beacon coincident with shaft 6 and the magnetic north coincident with the electromechanical zero of the bearing servo.

Since discs 4 and 5 are transparent, the observer will see the map with the vehicle symbol, positioned thereon at the point of true vehicle position. As the vehicle maneuvers with respect to the beacon, the vehicle symbol will move accordingly over the surface of the map. As a further feature, the vehicle symbol may be positioned to be aligned with the heading of the vehicle. A source of heading information 19, which may be a compass, positions an electromagnet 20 through heading servo 21 and through suitable gears such that electromagnet 20 is rotatably positioned as a function of the true heading of the vehicle. Electromagnet 20 causes vehicle symbol 11 to rotate on peg 10 and be aligned in agreement with the true heading of the vehicle. A presentation of vehicle position and heading with respect to a known beacon is thereby provided. More particularly, a pinion gear 24 is positioned in accordance with the vehicle bearing through bearing servo 16, gear 25 and ring gear 26. Electromagnet 20 is positioned through a spiral slotted disc 27 and is coupled to pinion gear 26 by right angle gears 28. Spiral slotted disc 27, similar to disc 4, is rotated in accordance with the vehicle range by means of gear 29 and range servo 14. Electromagnet 20 will be positioned in accordance with the vehicle position in the same manner as symbol 11 since it is free to move in slotted disc 27 and in-and-out on pinion gear 24. Bearing information from bearing servo 16 and heading information from heading servo 21 are subtracted at differential 22, and bearing and heading information is fed to rotate pinion gear 24. The rotation of pinion gear 24 causes electromagnet 20 to rotate by means of right angle gears 28. Electromagnet 20 therefore is constantly aligned with the true heading of the vehicle, and symbol 11, being magnetically responsive, will likewise be aligned to the true heading of the aircraft since it will rotate on peg 10 in response to the alignment of electromagnet 20.

The entire heading positioning system including disc 27, gears 24, 25, 26, 28, and 29, and electromagnet 20 is located below compartment 8.

A transparent cover 30 is included to complete the display system and to provide evenly distributed illumination during night time operation.

FIG. 5 shows transparent cover 30 in plan view, and a section A—A taken through its diameter is shown in FIG. 5A. Cover 30 is a concave acrylic sheet and includes a replaceable ring shaped lamp 31 in its outer circumference. An opaque shield 32 is positioned so as to permit light to escape in a particular direction as shown. A percentage of the light will be reflected from the top surface and emerge through the bottom surface. The varying angle of the bottom surface due to the concave shape will cause the light rays to emerge at varying angles providing an even illumination of map surface 9.

It is seen from the above discussion that a new and useful display system has been devised for indicating a vehicle's position with respect to a point of known reference. The display system may be employed in an aircraft using existing tacan equipment, or may be used in other navigable vehicles such as ships. The present invention is less complex and less costly than prior art systems, and it is compact enough to be easily utilized in small vehicles. The entire display may be secured to the arm rest of the observer's chair, and may be pivoted to swing out of the way when not being used. The display may be employed at any number of different geographical locations, with only a simple map changing procedure necessary for each new location. The display presentation may be based either on the intersection of two lines above the map, or the position vehicle symbol above the map.

While I have described above the principles of my invention in connection with specific apparatus, it is to be clearly understood that this description is made only by way of example and not as a limitation to the scope of my invention as set forth in the objects thereof and in the accompanying claims.

I claim:

1. A position display system for indicating the position of a vehicle with respect to a fixed geographical point comprising a pair of movable transparent discs rotatable about a reference point corresponding to said geographical point, one of said discs having a spiral slot representing vehicle distance from said reference point cut therein and the other of said discs having a radial slot representing vehicle bearing from said reference point cut therein, means for mounting one of said discs above the other on a common shaft at said reference point for movement with respect to each other so that said spiral and radial slots intersect during relative movement of said discs, a member positioned in said spiral and radial slots at said intersection thereof, said member being free to move in accordance with said intersection during relative movement of said discs, a map having said geographical point represented thereon, said map positioned below said discs such that said representative geographical point is located below said common shaft, a first source of signals representative of the bearing of said vehicle with respect to said reference point, a second source of signals representative of the distance of said vehicle with respect to said reference point, and means coupling said first and second sources of signals to said discs such that said member is moved accordingly and indicates the instantaneous bearing and distance of said vehicle with respect to said reference point, a third source of signals representative of the heading of said vehicle, an electromagnet positioned below said map, means responsive to said source of bearing signals and said source of distance signals for positioning said electromagnet below said vehicle symbol, and means coupling said source of bearing signals and said source of heading signals to said responsive means to align said electromagnet in accordance with said vehicle heading, said electromagnet thereby causing said vehicle symbol to be similarly aligned.

2. A position display system for indicating the position of a vehicle with respect to a fixed geographical point according to claim 1 wherein said responsive means includes:

a third movable disc rotatable about said point having a spiral slot representing said vehicle distance from said reference point cut therein;

a ring gear rotatable about said reference point, said ring gear having a radial pinion gear associated therewith; and right angle gears coupling said electromagnet to said pinion gear.

3. A position display system for indicating the position of a vehicle with respect to a fixed geographical point comprising:

a movable member representative of said vehicle;

a first source of signals representative of the bearing of said vehicle with respect to said geographical point;

a second source of signals representative of the distance of said vehicle from said geographical point;

a third source of signals representative of the heading of said vehicle;

an electromagnet;

means responsive to said source of bearing signals and said source of distance signals for positioning said electromagnet below said representative member; and means coupling said source of bearing signals and said source of heading signals to said responsive means to align said electromagnet in accordance with said vehicle heading, said electromagnet thereby causing said vehicle symbol to be similarly aligned.

References Cited by the Examiner

UNITED STATES PATENTS

| | | | |
|---|---|---|---|
| 568,755 | 10/96 | Greenough | 33—1 |
| 1,435,422 | 11/22 | Schiske | 235—78 X |
| 2,361,862 | 10/44 | Maupin | 33—1 |
| 2,407,893 | 9/46 | Meyer | 33—1 |
| 2,445,546 | 7/48 | Von Segebaden | 33—1 X |
| 2,528,142 | 10/50 | Herzlinger | 33—1 |
| 2,588,433 | 3/52 | Twamley. | |
| 2,718,061 | 9/55 | Omberg et al. | 33—1 |
| 2,803,061 | 8/57 | Jortberg | 33—1 |
| 2,946,053 | 7/60 | Dayton | 73—178 |
| 2,973,143 | 2/61 | Thompson | 235—78 |

ISAAC LISANN, *Primary Examiner.*

LOUIS R. PRINCE, *Examiner.*